Jan. 30, 1968  W. A. KASPAR  3,366,303
COMPARTMENTED SERVICE TRAY
Filed July 22, 1966
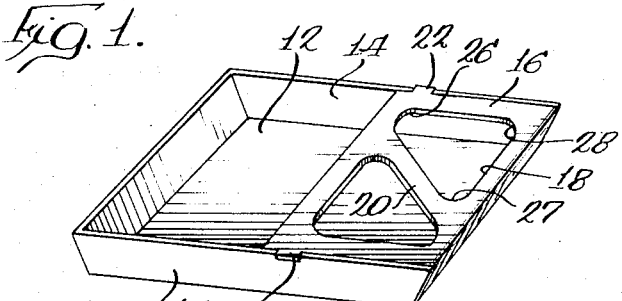
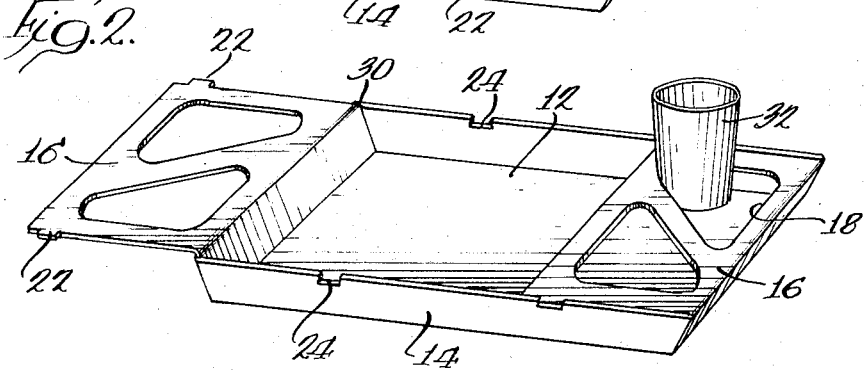
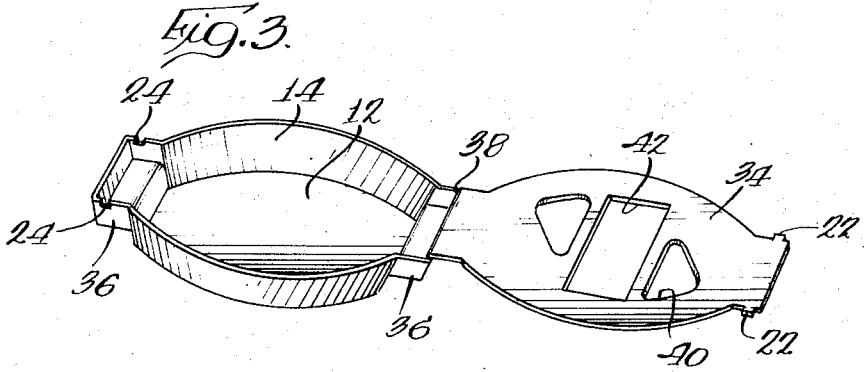
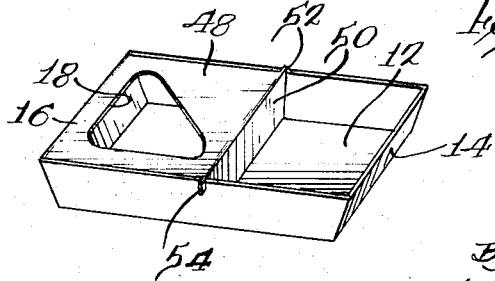
Inventor:
William A. Kaspar
By
Gradolph, Love, Rogers & Van Sciver
Att'ys United States Patent Office 3,366,303
Patented Jan. 30, 1968

3,366,303
COMPARTMENTED SERVICE TRAY
William A. Kaspar, 1000 Lake Shore Drive,
Chicago, Ill. 60611
Filed July 22, 1966, Ser. No. 567,242
2 Claims. (Cl. 229—2.5)

ABSTRACT OF THE DISCLOSURE

A rigid, compartmented service tray comprising a bottom panel, side walls around the bottom panel forming an enclosed eating surface, a top panel, means to hold the top panel to the side walls, and an aperture having rounded corners of different sizes adapted to laterally support beverage containers of various sizes on two sides with the beverage container being vertically supported by the bottom panel.

This invention relates to improvements in a service tray of the type used for carrying food and beverages from a roadside stand, or the like, to a patron in an automobile or dining area.

The present invention comprises an improvement over prior art trays as disclosed, for example, by Wenzel, Patent No. 3,009,623. In the Wenzel patent, an open panel, paperboard, collapsible service tray is disclosed in which circular apertures are provided for holding beverage containers and a central area is provided for carrying food items.

In general, the present invention provides a rigid, compartmented service tray which has a solid bottom and sides to protect the user should food or drinks spill, and a top panel having apertures to provide lateral support for beverage containers and a second level for the tray. Specifically, a unique trapezoidal aperture in a top panel is provided having rounded corners adapted to receive beverage containers of different standard sizes such as eight, twelve or sixteen-ounce cups. The trapezoidal aperture provides lateral support of the container on two sides and a third side may be supported by slight pressure of the hand. The beverage container rests on the bottom panel of the tray.

In the preferred form of the invention the trays are formed of a single piece of polystyrene foam. The top panel folds over a scored line or membrane and is secured to the side walls of the tray. Alternatively, the tray may be constructed of any sufficiently rigid material, such as plastic, pulp, paperboard, wood or aluminum. The trays may carry a printed message.

The bulk of the trays is minimized in storage and shipment by the nesting quality in disassembled form.

It is therefore an object of the present invention to provide a rigid, compartmented service tray as above.

A further object of this inevntion is to provide a rigid compartmented service tray which provides an enclosed eating surface and a secure support for beverage containers.

A further object of this invention is to provide a rigid, compartmented service tray requiring minimum storage space in disassembled form and which may be quickly and easily assembled for use.

Further aims, objects and advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

FIGURE 1 is a perspective view of an embodiment of the invention;

FIGURE 2 is a perspective view of an embodiment similar to FIG. 1 having two top panels;

FIGURE 3 is a perspective view of an alternative embodiment of the invention showing a tray having an oval shape; and FIGURE 4 is a perspective view of an alternative embodiment of the invention showing a modified top panel.

The rigid compartmented service tray shown in FIGS. 1 and 2 comprises a bottom panel 12, side walls 14 and a top panel 16. The top panel 16 includes two apertures 18 separated by a rib 20. The top panel 16 is held on the side walls 14 by the tabs 22 which fit in the tab recesses 24.

The apertures 18 which are adapted to hold beverage containers are of an irregular triangular or trapezoidal shape having rounded corners 26, 27 and 28. The corners 26, 27 and 28 are adapted to receive beverage containers of various sizes, such as eight, sixteen or twenty-four ounce cups. The container 32 is thus supported on two sides by the special shape of the aperture and on the third side by slight pressure of the hand as the tray is carried. This provides a secure support for the beverage container and prevents shifting.

FIG. 2 shows a two top panel tray partially assembled. The top panel 16 is preferably formed of the same material as the tray portion including bottom panel 12 and side walls 14.

In operation, personnel assembling the tray would fold the top panel 16 along the scoring 30 and secure the top panel 16 by tabs 22 in tab recesses 24 formed in side walls 14. The panel thus provides a second surface to the tray and gives lateral support to beverage containers approximately one inch from their base.

In its preferred construction of polystyrene foam, the top panel provides a gripping action on beverage containers within the apertures 18. If food personnel were instructed to place the containers 32 securely in the corners 26, 27 or 28, it is contemplated this gripping action would be sufficient to provide adequate lateral support in carrying the tray. In addition, polystyrene foam would provide insulation to maintain the temperature of the food.

FIG. 3 discloses an alternative embodiment of the present invention in an oval shape. This is designed specifically for material capable of being molded, such as a polystyrene foam, pulp or aluminum. At the ends of the long axis of the oval are formed handles 36. The top panel 34 is formed of the same material as the balance of the tray and has a scoring 38 connecting the top panel to the balance of the tray. The tray is assembled by folding the top panel over the bottom portion as in FIGS. 1 and 2. The top panel 34 covers the bottom panel 12 completely and includes a pair of beverage apertures 40 and a food aperture 42.

FIG. 4 shows an embodiment specifically designed for unmolded construction, such as paperboard. In this embodiment a flap 50 is formed in the top panel 48. A tongue portion 52 is formed at each end of the flap and is adapted to engage side slots 54 in the side walls 14. The operation of this embodiment is similar to that for FIGS. 1–3.

It is also contemplated that a separate top panel be provided. In assembling this tray, the separate top panel would be joined to the bottom panel by means of tabs in a manner similar to that disclosed in FIGS. 1 to 4.

Various modifications may be made in the invention without departing from the spirit and scope thereof, and it is desired, therefore, that only such limitations shall be placed thereon as are imposed by the prior art and are set forth in the appended claims.

What is claimed as new and desired to be secured by United States Letters Patent is:

1. A rigid, compartmented service tray of a material selected from the group consisting of paperboard, pulp board, plastic, and metal foils comprising a bottom panel, side walls around said bottom panel forming an enclosed eating surface, a top panel, tab and recess means to hold said top panel to said side walls, aperture means being of trapezoidal shape in said top panel, at least one of said aperture means having rounded corners of different sizes, said rounded corners adapted to laterally support beverage containers of generally cylindrical shape and of varying diameters on two sides, and said beverage container being vertically supported by said bottom panel.

2. In a rigid, compartmented service tray, the combination recited in claim 1 wherein said bottom panel, side walls and top panel are of one-piece construction and said tray being prepared for use by folding and securing said top panel to said side walls.

References Cited

UNITED STATES PATENTS

| | | | |
|---|---|---|---|
| 2,670,124 | 2/1954 | Buchmiller et al. | 206—72 X |
| 2,766,919 | 10/1956 | Randall | 206—72 X |
| 2,895,609 | 7/1959 | Rajotte | 206—72 |
| 3,009,623 | 11/1961 | Wenzel | 229—28 |
| 3,122,265 | 2/1964 | Innis | 206—72 X |
| 3,163,287 | 12/1964 | Barnett | 206—72 X |
| 3,189,247 | 6/1965 | Wischusen | 229—28 |
| 3,191,796 | 6/1965 | Schwartz et al. | 229—97 X |
| 3,295,737 | 1/1967 | Page et al. | 229—2.5 |

DAVIS T. MOORHEAD, *Primary Examiner.*